(12) United States Patent
Ellison et al.

(10) Patent No.: US 7,979,703 B2
(45) Date of Patent: Jul. 12, 2011

(54) DETERMINING THE REPUTATION OF A SENDER OF COMMUNICATIONS

(75) Inventors: Carl M. Ellison, Seattle, WA (US); Elissa E. S. Murphy, Seattle, WA (US); Manav Mishra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1360 days.

(21) Appl. No.: 11/254,076

(22) Filed: Oct. 19, 2005

(65) Prior Publication Data
US 2007/0086592 A1 Apr. 19, 2007

(51) Int. Cl.
*H04L 9/32* (2006.01)
(52) U.S. Cl. ......... 713/168; 713/170; 713/171; 709/206
(58) Field of Classification Search .......... 713/168–171; 709/206
See application file for complete search history.

(56) References Cited

U.S. PATENT DOCUMENTS

| | | | | |
|---|---|---|---|---|
| 6,895,507 | B1 * | 5/2005 | Teppler | 726/19 |
| 7,203,753 | B2 * | 4/2007 | Yeager et al. | 709/225 |
| 7,613,923 | B2 * | 11/2009 | Gilchrist et al. | 713/168 |
| 2002/0198950 | A1 | 12/2002 | Leeds | |
| 2004/0205135 | A1 | 10/2004 | Hallam-Baker | |
| 2005/0091319 | A1 * | 4/2005 | Kirsch | 709/206 |
| 2005/0091320 | A1 | 4/2005 | Kirsch | |
| 2006/0168057 | A1 * | 7/2006 | Warren et al. | 709/206 |

OTHER PUBLICATIONS

International Search Report for International Patent Application No. PCT/US2006/038518, Microsoft Corporation, Mar. 23, 2007.
Crocker, David H., "Standard for the Format of ARPA Internet Text Messages," RFC #822, Aug. 13, 1982.

* cited by examiner

*Primary Examiner* — Benjamin E Lanier
(74) *Attorney, Agent, or Firm* — Perkins Coie LLP

(57) ABSTRACT

A method and system for determining the reputation of a sender for sending desirable communications is provided. The reputation system identifies senders of communications by keys sent along with the communications. The reputation system then may process a communication to determine whether it is a desirable communication. The reputation system then establishes a reputation for the sender of the communication based on the assessment of whether that communication and other communications sent by that sender are desirable. Once the reputation of a sender is established, the reputation system can discard communications from senders with undesired reputations, provide to the recipient communications from senders with desired reputations, and place in a suspect folder communications from senders with an unknown reputation.

15 Claims, 11 Drawing Sheets key table 400

| key | name | reputation | classification | sender | messages |
|---|---|---|---|---|---|
| 53CFE | Joe | .7/25% | potentially undesirable | joe@ . . . | ⌒→ |
| 4DAF2 | ~~~~ | .1/75% | potentially undesirable | yza@ . . . | ⌒→ |
| ⋮ | | | | | |
| 9DA124 | Mary | .9/95% | desired | mary@ . . . | ⌒→ |
| ⋮ | | | | | |
| FF13AZ | ~~~~ | .1/95% | undesired | junk@ . . . | ⌒→ |

*FIG. 4*

DETERMINING THE REPUTATION OF A SENDER OF COMMUNICATIONS

BACKGROUND

Electronic communications such as electronic mail are being increasingly used for both business and personal uses. Electronic communications have many advantages over non-electronic communications such as postal mail. These advantages include low cost, rapid delivery, ease of storage, and so on. As a result of these advantages, there is also an important disadvantage of electronic communications, which is that many of the communications are undesired by the recipient. Such undesired electronic communications are referred to as junk mail, spam, and so on. Because of its low cost and speed, many organizations use electronic communications to advertise. For example, a retailer may purchase a list of electronic mail addresses and send an electronic mail message containing an advertisement for its products to each electronic mail address. It is not uncommon for a person to receive many such unwanted and unsolicited electronic mail messages each day. People receiving such junk electronic mail messages typically find them annoying. Junk electronic mail messages may also cause a person's inbox to become full and may make it difficult to locate and identify non-junk electronic mail messages.

Various techniques have been developed to combat junk electronic mail. For example, some electronic mail systems allow a user to create a list of junk electronic mail senders. When an electronic mail message is received from a sender on the list of junk electronic mail senders, the electronic mail system may automatically delete the junk electronic mail message or may automatically store the junk electronic mail message in a special folder. When a junk electronic mail message is received from a sender who is not currently on the junk electronic mail list, the recipient can indicate to add that sender to the list. As another example, some electronic mail systems may allow the recipient to specify a list of non-junk senders. If an electronic mail message is received from a sender who is not on the list of non-junk senders, then the electronic mail system may automatically delete or otherwise specially handle such an electronic mail message.

The effectiveness of such techniques depends in large part on being able to correctly identify the sender of an electronic mail message. Electronic mail systems, however, as originally defined in RFC 822 entitled "Standard for the Format of ARPA Internet Text Messages" and dated Aug. 13, 1982, provided no security guarantees. In particular, any sender could construct a message that looks like it came from any other sender. Thus, a recipient could not be sure of the true identity of the sender.

To overcome this identity problem, various key management infrastructure systems have been developed. These key management infrastructure systems either use an asymmetric (e.g., public key and private key pair) or a symmetric encryption technique. For example, with a public key infrastructure, a sender generates a public key and private key pair and then registers their public key with a key server. The sender digitally signs their electronic mail messages with the private key. When a recipient receives an electronic mail message purportedly from the sender, the recipient can retrieve the public key of the sender from the key server and verify the digital signature.

Current public key infrastructure systems are, however, both expensive and inadequate. The expense results from the overhead of providing and maintaining the key servers needed to support the infrastructure. The public key infrastructure systems are inadequate because they do not have effective mechanisms for uniquely identifying a sender. In particular, many different senders may have the same name (e.g., "John Smith") and thus it can be difficult for a recipient who wants the public key of the sender to effectively identify that sender. Moreover, the public key infrastructure does not have an effective way of alerting recipients when new public keys have been assigned to senders. Thus, a recipient may need to access the public key server whenever the recipient receives a communication.

SUMMARY

A method and system for determining the reputation of a sender for sending desirable communications is provided. The reputation system identifies senders of communications (e.g., electronic mail messages) by keys sent along with the communications. Upon receiving a communication, the reputation system of the recipient may first verify that the communication was digitally signed with the corresponding private key. The reputation system then may process a communication that has been correctly digitally signed to determine whether it is a desirable communication. The reputation system then establishes a reputation for the sender of the communication based on the assessment of whether that communication and other communications sent by that sender are desirable. The reputation system identifies a sender by the key included with or identified by a communication. If communications are received from a recipient who has been classified as undesired, then the reputation system may automatically process communications from that sender so as not to burden the recipient. If communications are received from a recipient who has been classified as desired, then the reputation system may automatically provide those communications to the recipient. If the reputation of the sender has not yet been completely established, then the reputation system may provide those communications to the recipient with an indication indicating that the communications are potentially undesirable. The recipient can review the communications that are potentially undesirable and may indicate that the communications from that sender are, and thus the sender is, desired, undesired, or still potentially undesirable.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 illustrates a key data structure used to track information associated with a key identified in one or more communications in one embodiment.

DETAILED DESCRIPTION

Figure 1:
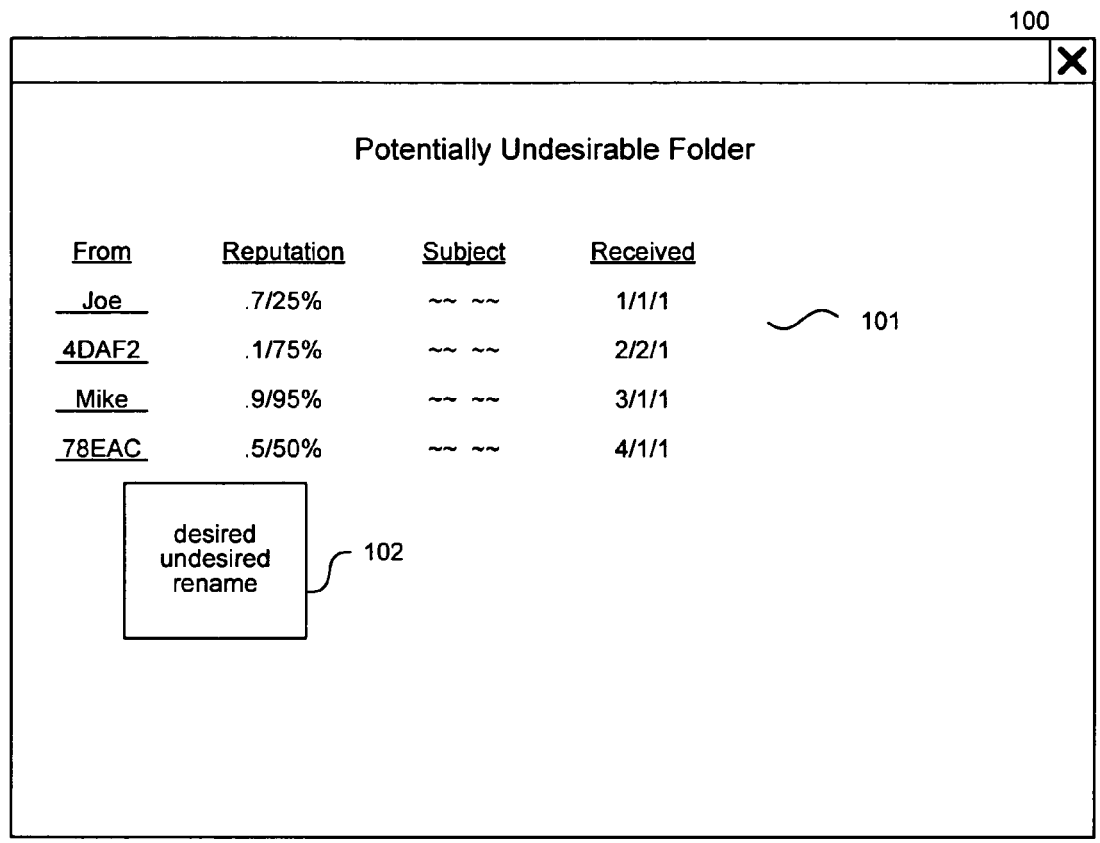
FIG. 1 is a display page that illustrates the display of electronic mail messages that have been classified as potentially undesirable in one embodiment.

A method and system for determining the reputation of a sender for sending desirable communications is provided. In one embodiment, the reputation system identifies senders of communications (e.g., electronic mail messages) by keys sent along with the communications. For example, a sender of electronic mail messages may digitally sign the electronic mail messages with their private key and transmit their public key along with the electronic mail messages to the recipient. Upon receiving a communication, the reputation system of the recipient may first verify that the communication was digitally signed with the corresponding private key. If so, the reputation system may assume that the sender had knowledge of the private key. Otherwise, the reputation system may assume that the sender is an imposter and set aside the communication without further processing (e.g., discard the communication or place the communication in a special folder). The reputation system then processes the communication to determine whether it is a desirable communication. The desirability of a communication may be based on subjective criteria of the recipient, objective criteria common to many recipients, and so on. In the case of an electronic mail message, a message may be desirable when it is known not to be spam. In such a case, various well-known spam detection techniques may be used to assess the desirability of electronic mail messages. The reputation system then establishes a reputation for the sender of the communication based on the assessment of whether that communication and other communications sent by that sender are desirable. The reputation system identifies a sender by the key included with or identified by a communication. The reputation system may analyze the history of communications of a sender and use a metric to score the reputation of the sender. If a sender has a reputation for sending undesired communications, then the reputation system may automatically classify the sender as undesired. Alternatively, the reputation system may provide reputation information to a recipient so that the recipient can decide whether the sender should be classified as undesired. In addition, if a sender has been classified as desired, then the reputation system may automatically consider further communications from that sender to be desired (e.g., not spam). Alternatively, the reputation system may provide reputation information to a recipient so that the recipient can decide whether to classify the sender as desired. If communications are received from a recipient who has been classified as undesired, then the reputation system may automatically discard all communications from that sender or otherwise specially process those communications such as placing them in a folder of communications from undesired senders. If placed in a folder, the recipient can later decide on how to process (e.g., discard) the communications. If communications are received from a recipient who has been classified as desired, then the reputation system may automatically provide those communications to the recipient. For example, the reputation system may store an electronic mail message from a desired sender directly in the inbox of the recipient. If the reputation of the sender has not yet been completely established, then the reputation system may provide those communications to the recipient with an indication indicating that the communications are potentially undesired. For example, the reputation system may store an electronic mail message that is potentially undesired in a potentially undesired folder. The recipient can review the communications that are potentially undesired and may indicate that the communications from that sender are, and thus the sender is, desired, undesired, or still potentially undesired. In this way, the reputation system can learn the reputation of senders identified by keys without having to employ a public key type infrastructure to help ensure the identity of the senders of communications.

In one embodiment, the reputation system executing on one computer system may request another computer system to provide the reputation of a sender. For example, the reputation system may receive a communication that includes a key that the recipient has not seen before. As such, the reputation system does not have any context for judging the reputation of the sender, except for the content of the message itself. The reputation system may request another computer system such as a server computer system or a peer computer system to provide the reputation that the other computer system has established for that sender. Upon receiving the reputation from the other computer system, the reputation system can factor in that reputation in establishing the initial reputation for the previously unseen sender. For example, the recipient may request five peer computer systems to provide the reputation that they have established for the sender. If four of the peer computer systems respond that the sender has a very high reputation, then the reputation system may set the initial reputation to very high. If, however, the responding peer computer systems indicate that the sender has a very low reputation, then the reputation system may set the initial reputation to very low. If two of the peer computer systems respond that the sender has a very high reputation and the other two of the peer computer systems respond that the sender has a very low reputation, then the reputation system may set the initial reputation to potentially undesired (e.g., unknown) so that the reputation system can treat further communications from that sender as potentially undesired. Each peer computer system may establish the reputation of the sender by factoring in the reputation of that sender provided by its peer computer systems. For example, a computer system may combine a reputation derived from the communications that it received from the sender with the average reputation from its peer computer systems to establish the reputation of the sender. The computer system may use a weighting factor to factor its derived reputation higher than the reputations provided by its peers. For example, if a computer system derives a reputation of 0.7 for a sender based on analysis of the communications it received from that sender and its peer computer systems provide an average reputation of 0.3, the computer system may weight the peer reputation 25% and adjust the derived reputation by 25% of the difference in the reputations. In this example, the difference is −0.4 (i.e., 0.3−0.7) and 25% of the difference is −0.1. So, the reputation system may establish the combined reputation as 0.6 (i.e., −0.1+0.7). Such a technique will cause the weight of peers to exponentially decay based on distance of peers, peers of peers, and so on. One skilled in the art will appreciate that a variety of weighting techniques may be used in which reputations are combined in a linear or non-linear manner.

In one embodiment, the reputation system may identify a sender by their public key or by an identification assigned to the public key by the recipient. When the reputation system receives a communication that includes a previously unseen public key, the reputation system will not know the true identity of the sender. For example, an impostor may generate a new public key and private key pair, may prepare a communication purportedly from a known sender that explains that the sender's security has been compromised, may digitally sign the communication, and may send the communication along with the public key to a recipient. Upon receiving the communication, the reputation system can verify that the communication was correctly digitally signed, but cannot verify the identity of the sender unless some other secret information that is shared between the purported sender and recipient is included with the communication or provided via some out-of-band communication, such as a telephone call. The reputation system may allow the recipient to provide a name (e.g., "John Smith" or "Spammer1") for a key as a mnemonic to help identify what is believed to be the actual sender of communications. The reputation system may adjust the reputation score of a sender to indicate the reputation of the sender that has been learned over time. The reputation system may display information relating to a sender who sends potentially undesirable communications so that the recipient can decide whether the communications are desired or undesired. The displayed information may include the current score for the sender, the name provided by the recipient, the history of communications sent by the sender, and so on.

In one embodiment, the reputation system may detect that a sender who is classified as desired (e.g., has a good or desired reputation) has started to send communications that are undesirable. This switch to undesirable communications may result from an initially incorrect assessment of the desirability of communications from the sender, from an illegitimate sender tricking a recipient by initially sending desired communications followed by many undesired communications, from a third party that has taken control of a legitimate sender's computer system, and so on. Regardless of how the switch in desirability has occurred, the reputation system may notify the sender that its communications are now considered undesirable. The reputation system may classify the sender identified by the public key as undesired so that all future communications that include that public key are discarded. If the sender was a legitimate sender, then the sender will likely investigate and correct the problem. For example, if the sender's computer system has become infected, the sender may remove the infection and regenerate a new public key and private key pair. If the sender is not legitimate, then the sender may again try to trick the reputation system using a new public key and private key pair. In either case, if the infection of a sender's computer system is relatively rare, then the overhead for the legitimate sender of regenerating a new public key and private key may be small compared to the other problems caused by the infection. Similarly, the overhead of the recipient in relearning the reputation of the sender may be an acceptable tradeoff of ensuring that undesired communications are discarded. In addition, the overhead for the recipient of relearning a new reputation for the legitimate sender may be acceptable. In contrast, the process of regenerating public key and private key pairs can present a considerable burden to an illegitimate sender who is sending millions of communications. Moreover, the relearning of the reputation of an illegitimate sender may result in a more accurate assessment of the reputation as undesired.

In the following, the reputation system is described in the context of an electronic mail system. One skilled in the art will appreciate the reputation system may be used in other contexts to determine the reputation of senders of electronic communications. For example, the reputation system may be used to determine the reputation of senders of instant messages, providers of web pages (e.g., pop up), senders of voice mail, and so on. FIG. 1 is a display page that illustrates the display of electronic mail messages that have been classified as potentially undesirable in one embodiment. The display page 100 displays the electronic mail messages that have been stored within a folder named "potentially undesirable." The reputation system places communications from senders that have not yet been classified as desired or undesired into the potentially undesirable folder. The electronic mail message area 101 contains a line for each electronic mail message in the potentially undesirable folder. Each line includes the identification of the sender of the message, the reputation of the sender, the subject of the message, and the date the message was received. The identification of the message may be the public key provided with the message (e.g., 4DAF2) or the name assigned by the recipient (e.g., Joe). The reputation of a sender may be a value between 0 and 1 with 0 corresponding to the most undesired reputation and 1 corresponding to the most desired reputation. The reputation may also include a confidence score indicating a confidence of the reputation system in the assigned reputation score. For example, a reputation score of 0.95 may indicate that the communications received from the sender have been desirable, but a confidence score of 10% may indicate that not enough communications have been received to be confident that the reputation score is correct. The reputation system may allow the recipient to view the history of the electronic mail messages of a sender by selecting the name of the sender. The reputation system may also allow a recipient to set various attributes of an electronic mail message or sender such as designating the sender as being desired or undesired, changing the identification of the sender, and so on as indicated by the drop-down list 102 that may be displayed when the recipient right clicks on a sender's name.

Figure 2:
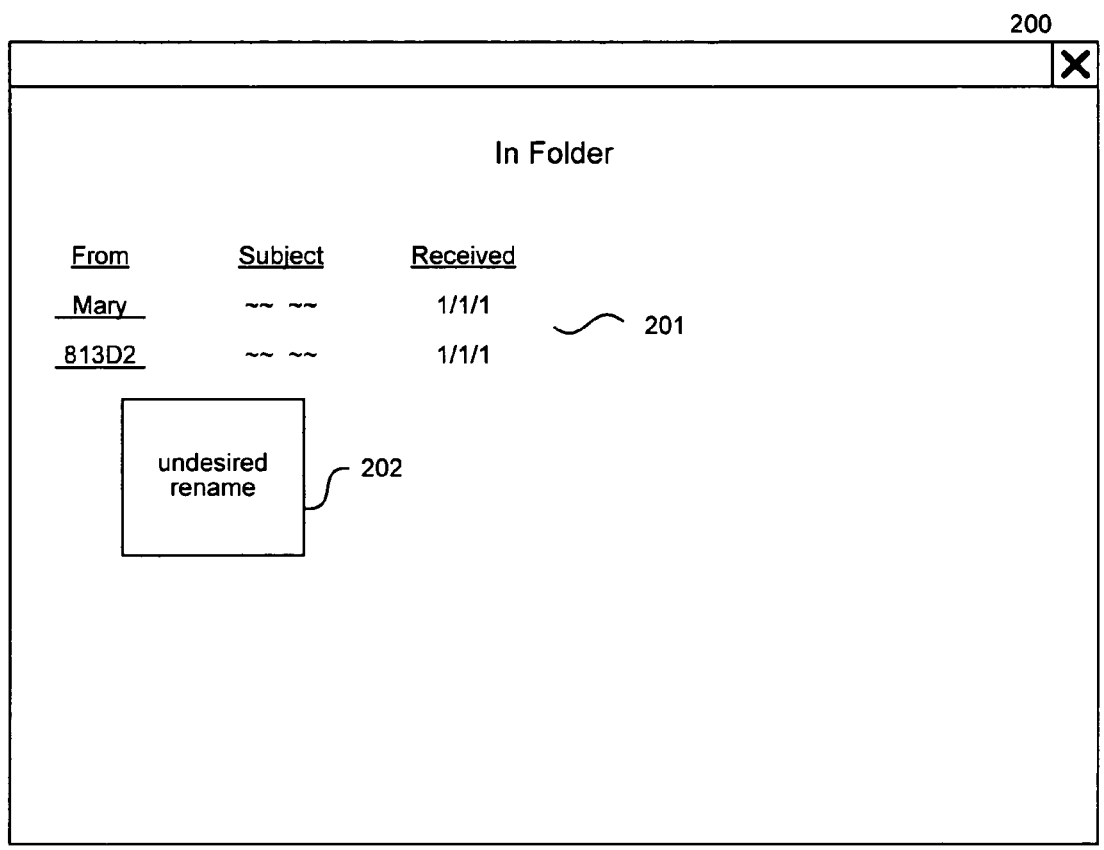
FIG. 2 is a display page that illustrates the display of electronic mail messages that have been classified as desirable in one embodiment.

FIG. 2 is a display page that illustrates the display of electronic mail messages that have been classified as desirable in one embodiment. Display page 200 represents an in folder of an electronic mail system. The in folder contains electronic mail messages that have been classified as desirable. The electronic mail message list 201 includes a line for each electronic mail message of the in folder. Each line identifies the sender, subject, and date received. A recipient can select a sender's identification to view more detailed information about the sender such as the history of electronic mail messages received from that sender or reputations provided by peer computer systems. The reputation system allows the recipient to change various properties of an electronic mail message such as the designation as desired, the identification, and so on. When the recipient right clicks on the name of the sender, the reputation system may display the drop-down list 202.

Figure 3:
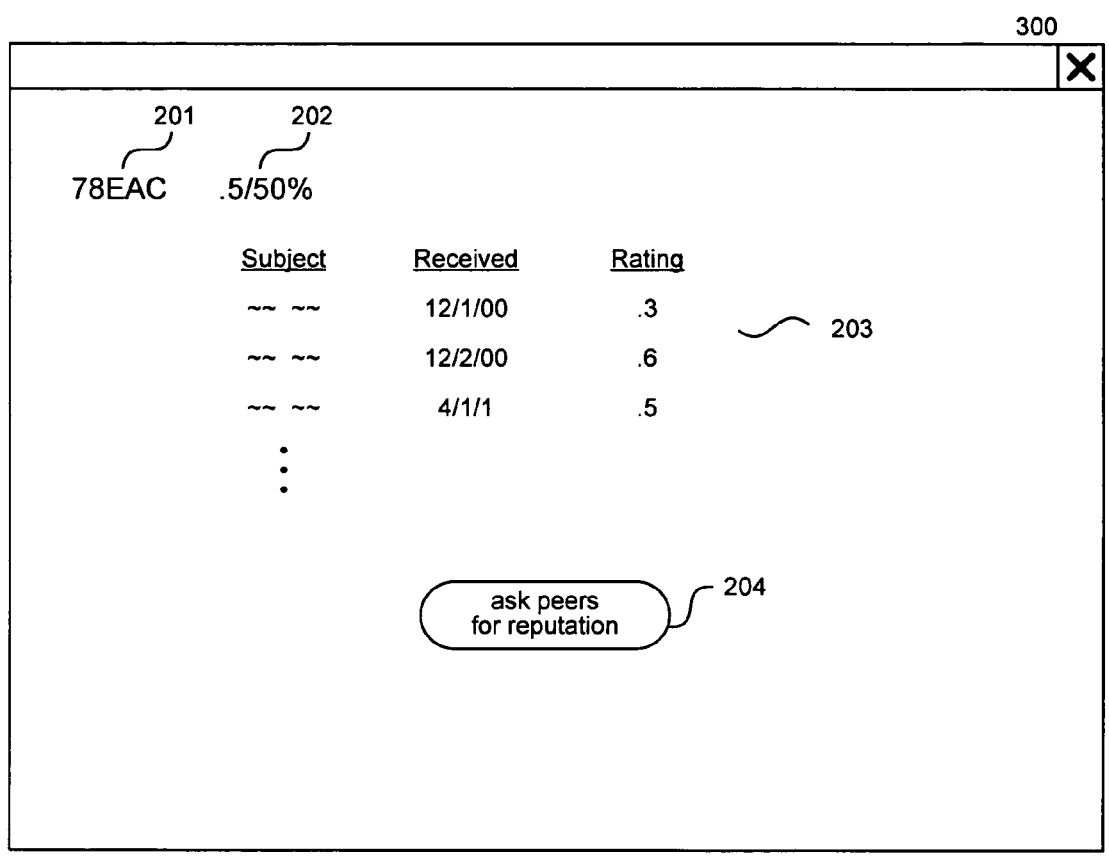
FIG. 3 is a display page that illustrates the display of the history of electronic mail messages of a sender in one embodiment.

FIG. 3 is a display page that illustrates the display of the history of electronic mail messages of a sender in one embodiment. The display page 300 identifies the sender by the sender identification 201 (e.g., 78EAC) and provides the sender's reputation 202 (e.g., 0.5/50%). The display page also includes an electronic mail message list 203 that contains a line for each electronic mail message received from the identified sender. Each line identifies the subject of the electronic mail message, the date received, and a rating of the desirability of that electronic mail message. The display page also includes an ask peers for reputation button 204. A recipient who wants to ask peer computer systems for the reputation that they established for the sender can select the button. In response, the reputation system sends a reputation request message to each peer computer system and receives a reputation reply message in response. The reputation system may display the responses on a separate display page. The reputation system may also calculate a combined reputation score from the scores of the peer computer systems. Alternatively, the reputation system may automatically send reputation request messages to peer computer systems when establishing the reputation of a sender.

FIG. 4 illustrates a key data structure used to track information associated with a key identified in one or more communications in one embodiment. In this embodiment, the key data structure is represented as key table 400 that includes a record (or row) for each sender, that is, each unique key. Each record identifies the key of the sender, the identification of the sender assigned by the recipient, the reputation/confidence score for the sender, the classification of the sender, the sender's address, and a link to the history of the sender's electronic mail messages. For example, the first record in the key table includes the key "53CFE," the identification "Joe," the reputation/confidence score "0.7/25%," the classification "potentially undesirable," and the sender address "joe@ . . . . " The classification of a sender may be desired, undesired, or potentially undesirable. One skilled in the art will appreciate that many different data structures other than a table (e.g., a tree structure, a hash table, and a linked list) may be used to the store the information of the key data structure.

Figure 5:
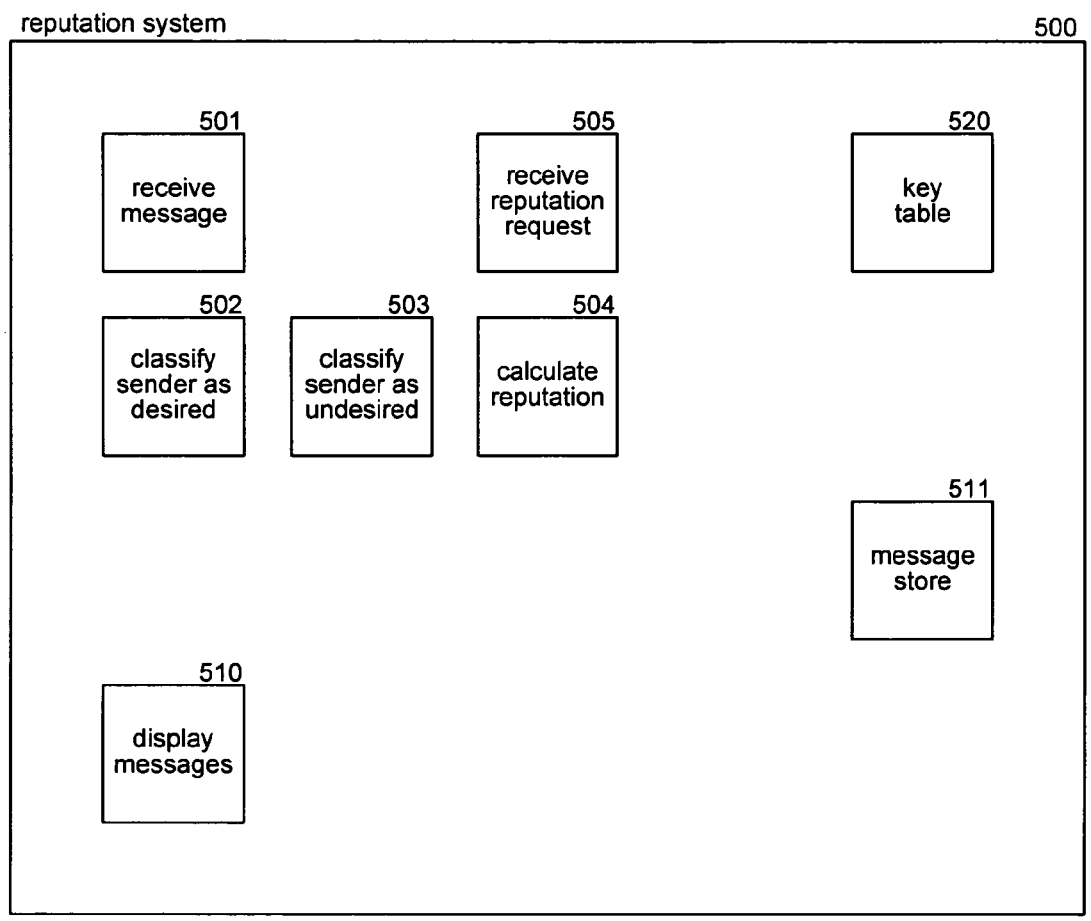
FIG. 5 is a block diagram that illustrates components of the reputation system in one embodiment.

FIG. 5 is a block diagram that illustrates components of the reputation system in one embodiment. The reputation system 500 may be implemented on various computing devices and include a receive message component 501, a classify sender as desired component 502, a classify sender as undesired component 503, a calculate reputation component 504, and a receive reputation request component 505. The receive message component receives messages, verifies the signature, and processes the messages depending on whether the sender is classified as desired, undesired, or potentially undesirable. The classify sender as desired component allows a recipient to manually classify a sender as desired. The classify sender as undesired component allows a recipient to manually classify a sender as undesired. The reputation system may also include a component to classify as potentially undesirable a sender who has been classified as desired or undesired. The calculate reputation component calculates the reputation of a sender and may factor in the reputations provided by peer computer systems. The receive reputation request component receives requests for the reputation of a sender from peer computer systems and responds with the reputation it has established of the sender. The reputation system component also includes a display messages component 510 and a message store component 511. The message store component contains the messages that have been received. The message store may be organized into folders. The display messages component displays the messages of a selected folder and may allow the recipient to set the attributes of a sender or a message. The reputation system also includes a key table 520 as described with reference to FIG. 4.

The computing device on which the reputation system is implemented may include a central processing unit, memory, input devices (e.g., keyboard and pointing devices), output devices (e.g., display devices), and storage devices (e.g., disk drives). The memory and storage devices are computer-readable media that may contain instructions that implement the reputation system. In addition, the data structures and message structures may be stored or transmitted via a data transmission medium, such as a signal on a communications link. Various communications links may be used, such as the Internet, a local area network, a wide area network, or a point-to-point dial-up connection.

The reputation system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The reputation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 6:
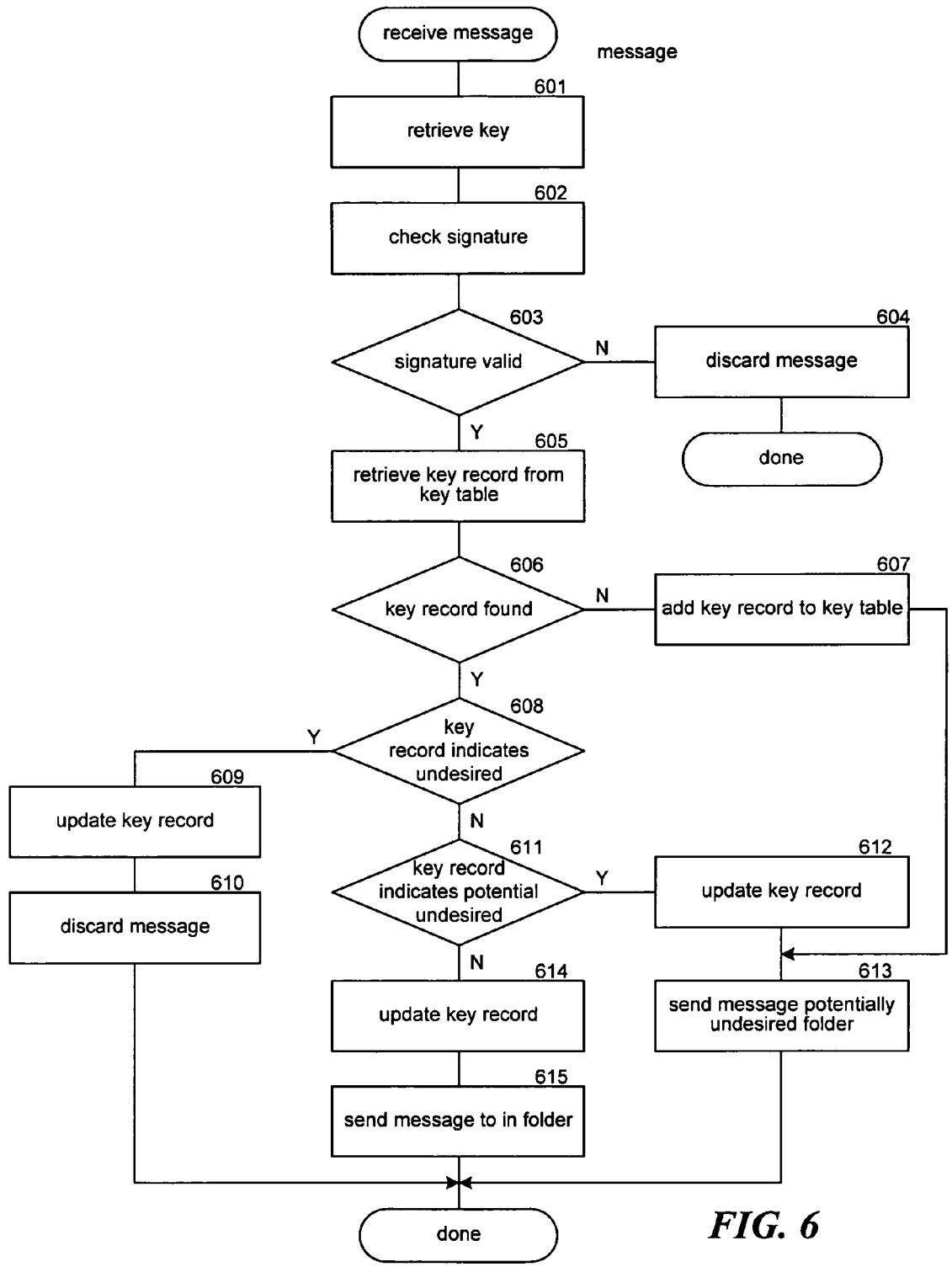
FIG. 6 is a flow diagram that illustrates the processing of the receive message component in one embodiment.

FIG. 6 is a flow diagram that illustrates the processing of the receive message component in one embodiment. The receive message component receives messages, classifies the messages, and stores the messages in the appropriate folders. In block 601, the component retrieves the key identified by the message, which may be included with a message or provided via some other mechanism. In block 602, the component checks the signature of the message using the retrieved key. In decision block 603, if the signature is valid, then the component continues at block 605, else the component discards the message in block 604 and then completes. A message that does not include a valid signature may mean that an impostor who does not have the private key corresponding to the public key has tried to send a message while impersonating the purported sender. In block 605, the component retrieves the key record from the key table corresponding to the retrieved key. In decision block 606, if the key record was found, then the reputation system has a history associated with the retrieved key and continues at block 608, else the reputation system has no history and continues at block 607. In block 607, the component adds a key record to the key table for the retrieved key and then stores the message in the potentially undesirable folder in block 613 and completes. In decision block 608, if the key record indicates that the sender is undesired, then the component continues at block 609, else the component continues at block 611. In block 609, the component updates the key record to indicate that another message has been received from the sender. In block 610, the component discards the message from the undesired sender and then completes. In decision block 611, if the key record indicates that the sender is potentially undesirable, then the component continues at block 612, else the sender is desired and the component continues at 614. In block 612, the component updates the key record to indicate that a new message has been received from a sender that is potentially undesirable. In block 613, the component sends the message to the potentially undesirable folder and then completes. In block 614, the component updates the keyword to indicate that the message has been received from a sender that is desired. In block 615, the component sends the message to the in folder and then completes.

Figure 7:
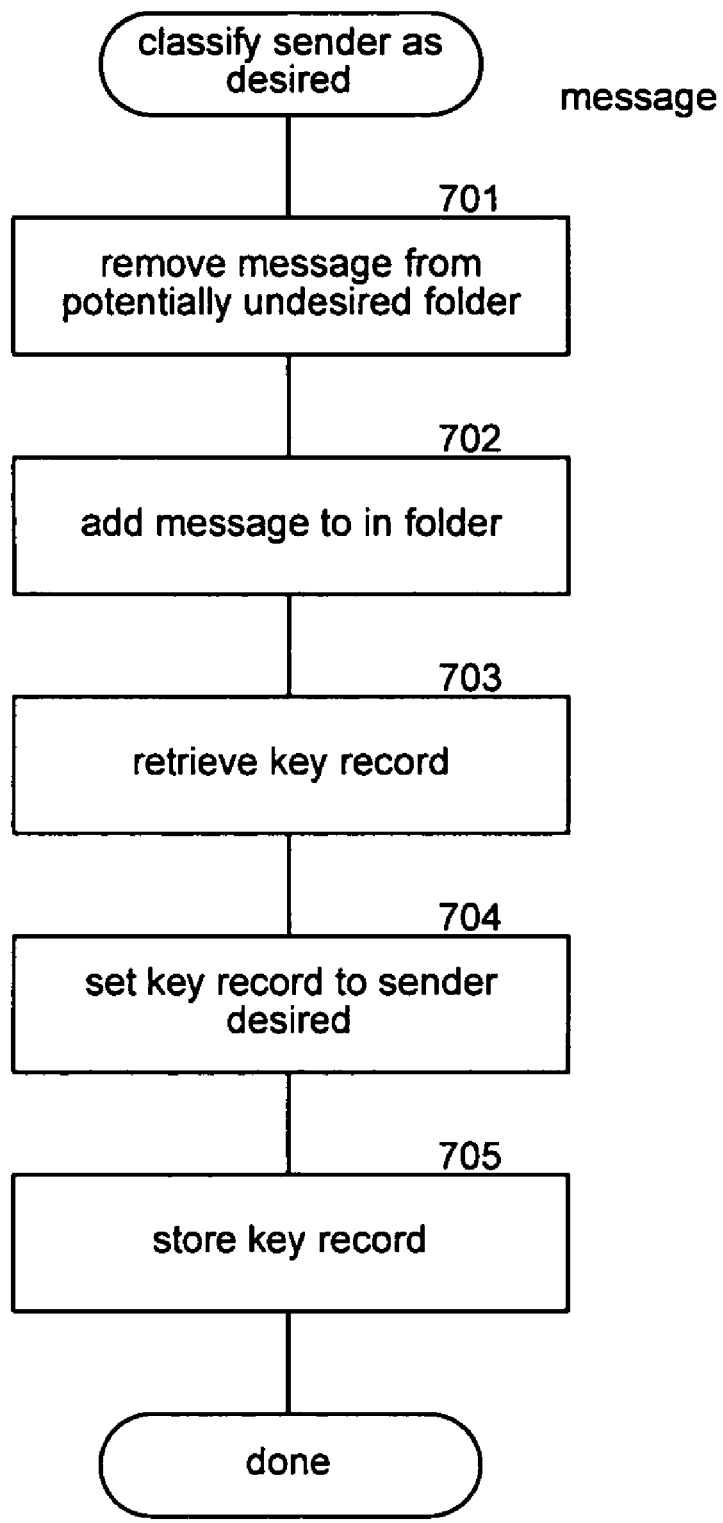
FIG. 7 is a flow diagram that illustrates the processing of the classify sender as desired component in one embodiment.

FIG. 7 is a flow diagram that illustrates the processing of the classify sender as desired component in one embodiment. The component receives a message and classifies the sender of the message as desired. The component may be invoked when a recipient selects a message that is in the potentially undesirable folder and classifies the recipient as desired. The reputation system may also allow a recipient to classify a sender as desired independently of any electronic mail message that the sender has sent. In block 701, the component removes the message from the potentially undesirable folder. In block 702, the component adds the message to the in folder. In block 703, the component retrieves the key record for the sender of the message. In block 704, the component sets the key record to indicate that the sender is classified as desired. In block 705, the component stores the key record in the key data structure and then completes.

Figure 8:
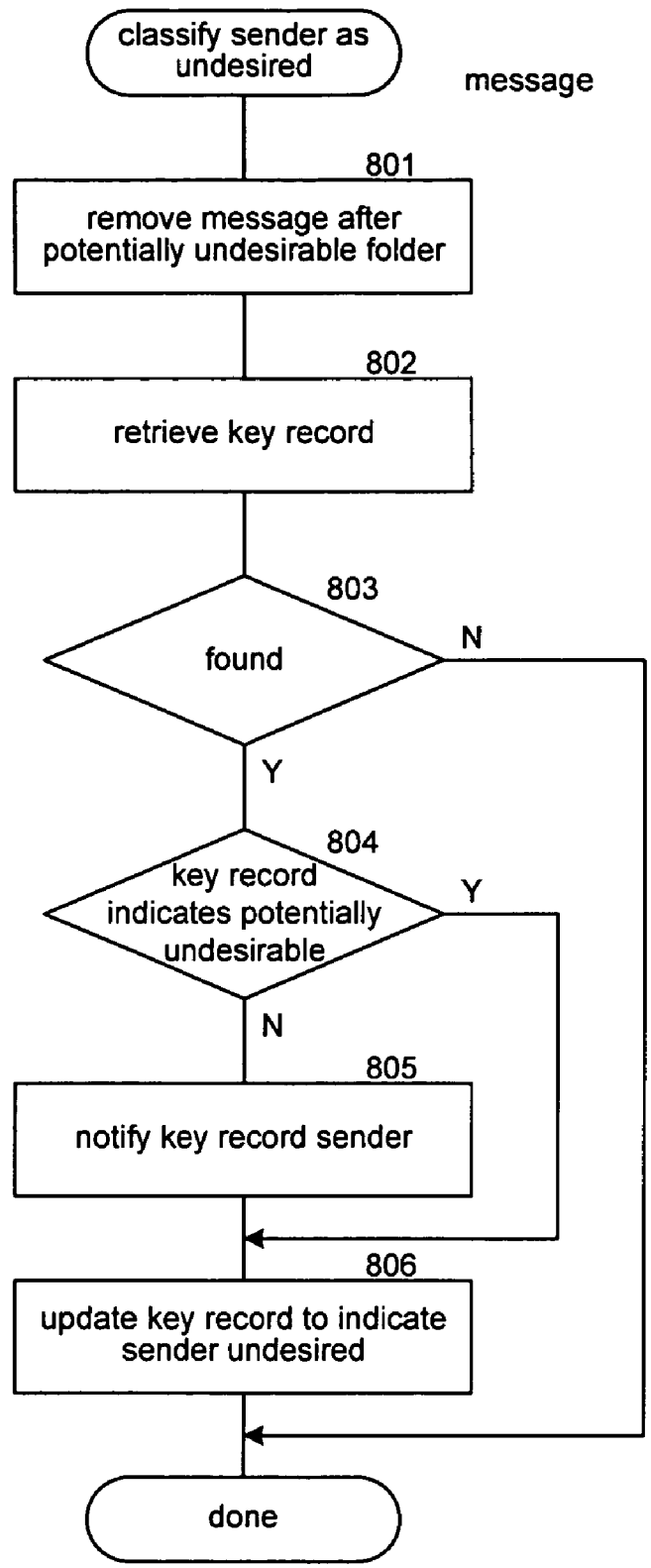
FIG. 8 is a flow diagram that illustrates the processing of the classify sender as undesired component in one embodiment.

FIG. 8 is a flow diagram that illustrates the processing of the classify sender as undesired component in one embodiment. The component receives a message and classifies the sender of the message as undesired. The component may be invoked when a recipient selects a message that is in the potentially undesirable folder and designates that the recipient is undesired. The reputation system may also allow a recipient to designate a sender as undesired independently of any electronic mail message that the sender has sent. In block 801, the component removes the message from the potentially undesirable folder. In block 802, the component retrieves the key record for the sender of the message. In decision block 803, if the key record was found, then the component continues at block 804, else the component completes. In decision block 804, if the key record indicates that the sender is potentially undesirable, then the component continues at block 806, else the sender was desired but for some reason is now undesired and the component continues at block 805. In block 805, the component may notify the sender identified in the retrieved record that an undesired electronic mail message has been received purporting to be sent from that sender. In block 806, the component updates the key record to indicate that the sender is undesired and then completes.

Figure 9:
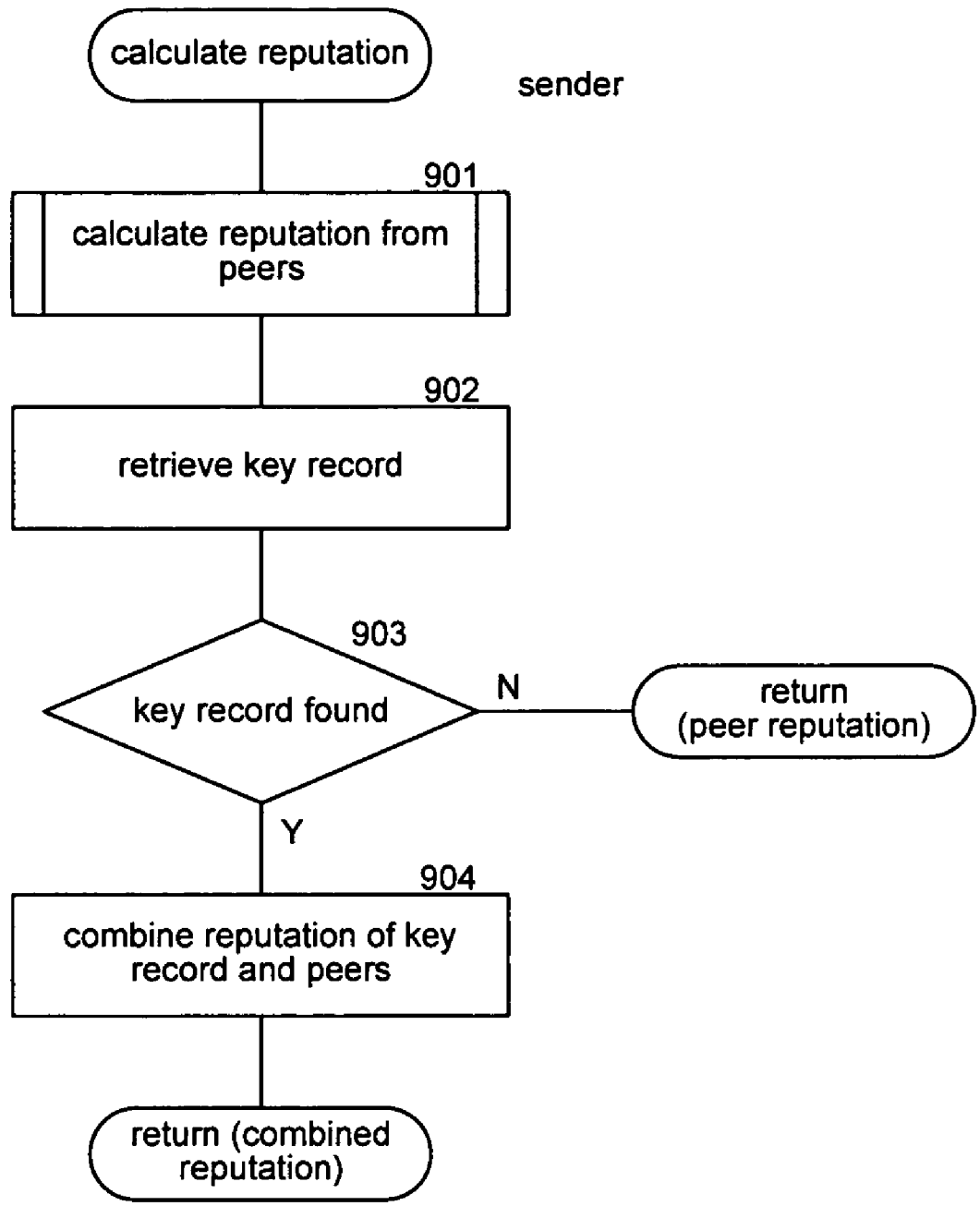
FIG. 9 is a flow diagram that illustrates the processing of the calculate reputation component in one embodiment.

FIG. 9 is a flow diagram that illustrates the processing of the calculate reputation component in one embodiment. The component is invoked to calculate the reputation of a sender. In block 901, the component may invoke the calculate reputation from peers component to calculate a reputation established by peer computer systems. In block 902, the component retrieves the key record for the sender. In decision block 903, if the key record was retrieved, then the component continues at block 904, else the component may return the reputation as calculated by the peer computer systems. In block 904, the component combines the reputation from the retrieved key record and the reputation from the peer computer systems. The component then returns the combined reputation.

Figure 10:
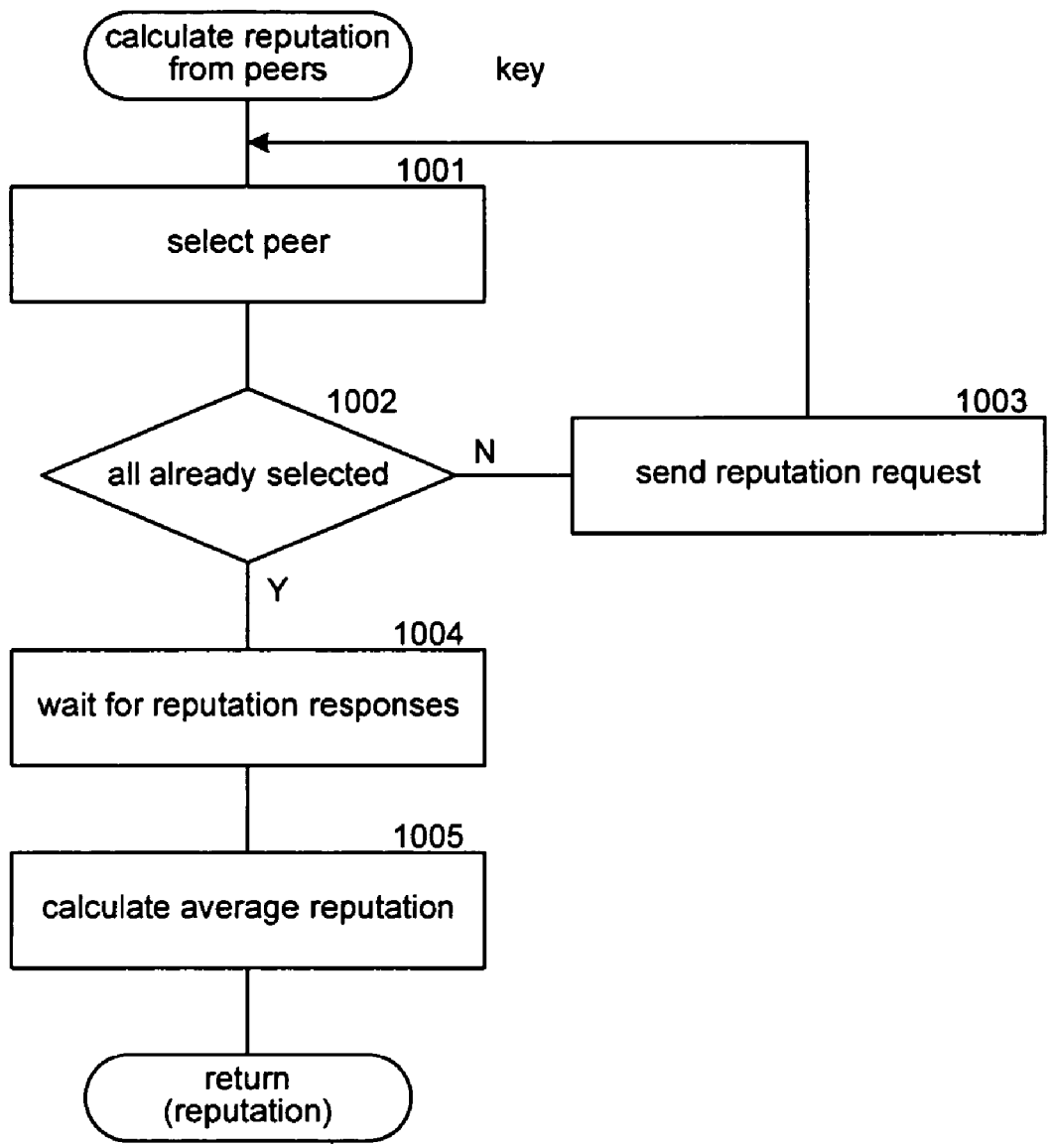
FIG. 10 is a flow diagram that illustrates the processing of the calculate reputation from peers component in one embodiment.

FIG. 10 is a flow diagram that illustrates the processing of the calculate reputation from peers component in one embodiment. The component sends reputation request messages to peer computer systems and then calculates an average reputation. In blocks 1001-1003, the component loops sending the reputation request messages to the peer computer systems. In block 1001, the component selects the next peer computer system. In decision block 1002, if all the peer computer systems have already been selected, then the component continues at block 1004, else the component continues at block 1003. In block 1003, the component sends a reputation request message to the selected peer computer system and then loops to block 1001 to select the next peer computer system. In block 1004, the component waits for the reputation responses from the peer computer systems. In block 1005, the component calculates the average reputation from the peer computer systems and returns that as the calculated reputation.

Figure 11:
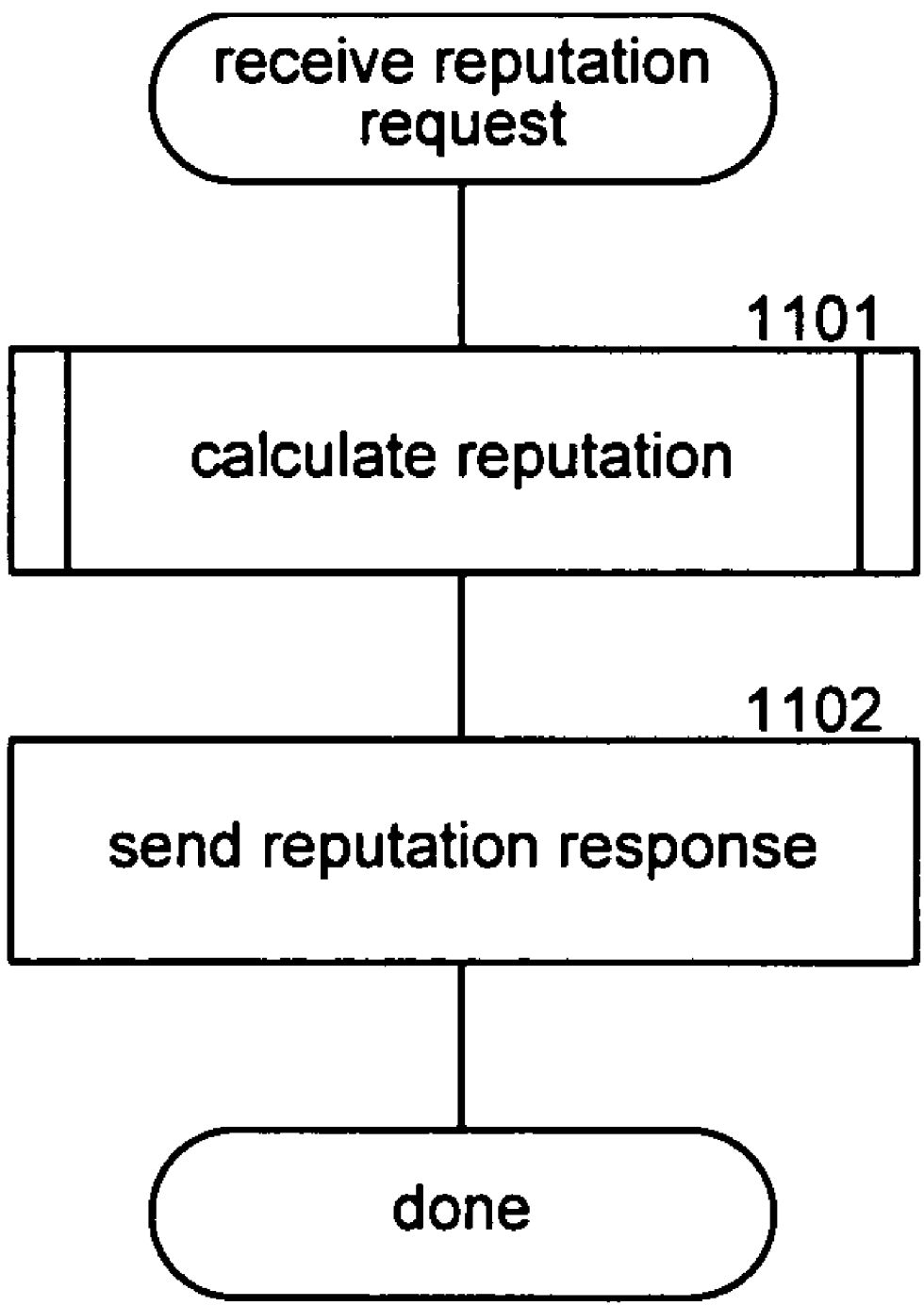
FIG. 11 is a flow diagram that illustrates the processing of the receive reputation request component in one embodiment.

FIG. 11 is a flow diagram that illustrates the processing of the receive reputation request component in one embodiment. The component receives a reputation request message from a peer computer system, calculates the reputation of the requested sender (if not already calculated), and sends a reputation reply message. In block 1101, the component invokes the calculate reputation component, which may calculate the reputation based on other peer computer systems. Alternatively, the component may retrieve the reputation from the key table. In block 1102, the component sends a reputation response message indicating the reputation of the sender and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computer system of a recipient for processing communications based on reputation of senders, the method comprising:
  receiving from a sender an initial communication addressed to the recipient, the initial communication including a public key of a private and public key pair;
  verifying whether the initial communication was signed by the private key corresponding to the public key without verifying via a public key infrastructure whether the public key is a registered public key of the sender;
  upon verifying that the initial communication was signed by the private key,
    determining desirability of the initial communication by receiving from the recipient an indication of whether the initial communication is desired;
    establishing a reputation based on desirability of the initial communication; and
    associating the reputation with the public key;
  receiving a subsequent communication addressed to the recipient, the subsequent communication including the public key;
  verifying whether the subsequent communication was signed by the private key corresponding to the public key without verifying via the public key infrastructure whether the public key is a registered public key of the sender; and
  upon verifying that the subsequent communication was signed by the private key,
    adjusting the reputation associated with the public key based on desirability of the subsequent communication; and
    processing the subsequent communication based on the adjusted reputation associated with the public key.

2. The method of claim 1 wherein the establishing of a reputation includes requesting another computer system to provide the reputation that it has associated with the public key.

3. The method of claim 2 wherein the other computer system bases its reputation that it has associated with the public key on the reputation that the other computer system has established for a communication that includes the public key.

4. The method of claim 2 wherein the established reputation based on the initial communication and the reputation provided by the other computer system are combined to provide a revised reputation to be associated with the public key.

5. The method of claim 2 wherein the other computer system is a peer computer system.

6. The method of claim 2 wherein the other computer system is a server computer system that aggregates reputations associated with public keys.

7. The method of claim 1 wherein the communications are electronic mail messages and the desirability of an electronic mail message is based on whether the electronic mail message is spam.

8. The method of claim 1 including allowing a user to provide a name for the sender so that the user can identify the sender by name rather than by private key.

9. The method of claim 1 wherein when a user determines that an undesired communication has been received that includes the public key and that the public key has an associated reputation that is desirable, notifying the sender that the sender's private key may have been compromised.

10. The method of claim 9 including setting the reputation that is associated with the public key to not desirable.

11. A computer-readable storage medium containing instructions for controlling a computer system of a recipient to provide a reputation for a sender of electronic mail messages, by a method comprising:
    receiving electronic mail messages addressed to the recipient that include a public key of a public and private key pair;
    determining whether the electronic mail messages may be undesired based on input of the recipient;
    establishing a reputation based on the determination as to whether the electronic mail messages are undesired and whether the electronic mail messages are signed by the private key; and
    associating the reputation with the public key without verifying whether the public key is registered with a public key infrastructure
    wherein subsequent communications that include the public key and are signed by the private key are processed in accordance with the reputation associated with the public key.

12. The computer-readable storage medium of claim 11 wherein the processing includes automatically placing electronic mail messages that include the public key in an in-folder when the reputation associated with the public key indicates desired electronic mail messages and the electronic mail messages are verified to have been signed by the private key and automatically placing electronic mail messages in a potentially undesired folder when the reputation associated with the public key is not known.

13. The computer-readable storage medium of claim 12 including automatically discarding electronic mail messages when the reputation associated with the public key indicates undesired electronic mail messages.

14. The computer-readable storage medium of claim 11 wherein the reputation is established based on reputations associated with the public key that are established by other computer systems.

15. A computer system of a recipient for processing communications associated a public key of a public and private key pair based on a reputation associated with the public key without determining whether the public key is registered with a public key infrastructure, comprising:
    a memory storing computer-executable instructions of
        a component that determines desirability of communications addressed to the recipient that are associated with the public key;
        a component that, when an initial communication is verified to have been signed by the private key, establishes an initial reputation associated with the public key based on the desirability of the initial communication based on content of the initial communication; and
        a component that, when a subsequent communication is verified to have been signed by the private key, processes the subsequent communication based on the established reputation for the public key; and
    a processor for executing the computer-executable instructions stored in the memory.

* * * * *